Fig.1.

June 30, 1953 — W. L. CORTEGGIANO ET AL — 2,644,075
INDUCTION HEATING MACHINE WITH CONTROLS
Filed July 15, 1949 — 8 Sheets-Sheet 1

INVENTORS
William L. Corteggiano, Milton P. Vore
and John M. Edwards.
ATTORNEY

Fig. 5.

INVENTORS
William L. Corteggiano, Milton P. Vore,
and John M. Edwards.
BY
B. L. Zaugarel
ATTORNEY

June 30, 1953  W. L. CORTEGGIANO ET AL  2,644,075
INDUCTION HEATING MACHINE WITH CONTROLS
Filed July 15, 1949  8 Sheets-Sheet 6

WITNESSES:

INVENTORS
William L. Corteggiano, Milton P. Vore
and John M. Edwards.
BY
ATTORNEY June 30, 1953  W. L. CORTEGGIANO ET AL  2,644,075
INDUCTION HEATING MACHINE WITH CONTROLS Filed July 15, 1949  8 Sheets-Sheet 7

WITNESSES:
Edward Michaels
New. L. Groome

INVENTORS
William L. Corteggiano, Milton P. Vore.
and John M. Edwards.
BY
B. L. Dougall
ATTORNEY

Patented June 30, 1953

2,644,075

UNITED STATES PATENT OFFICE 2,644,075

INDUCTION HEATING MACHINE WITH CONTROLS

William L. Corteggiano, Baltimore, Milton P. Vore, Catonsville, and John M. Edwards, Baltimore, Md., assignors to Westinghouse Electric Corporation, East Pittsburgh, Pa., a corporation of Pennsylvania Application July 15, 1949, Serial No. 104,944

8 Claims. (Cl. 219—47)

Broadly, this invention is directed to an induction heating machine adapted to heat-treat short round bars, rods and similar workpieces successively passed end to end through the machine; but the machine and parts thereof are useful for other purposes. More specifically, this invention is directed to providing an induction heating machine adapted to case harden batches of shifter rails for automobiles, the shifter rails of a batch being the same within manufacturing tolerances, but different from the rails of a different batch.

A very important object of our invention is to provide an induction heating machine having means for heat-treating production workpieces as they move horizontally through the machine rather than down a slope or vertically as in the prior art.

An overall purpose of the invention is to provide an induction heating machine which is rugged, which is economical in operation, which minimizes handling of the workpieces, which is substantially foolproof in operation so that it can be operated by unskilled labor, and which is sufficiently flexible to heat-treat batches of workpieces which differ in size or shape or other properties.

An important object of our invention is to provide an induction heating machine adapted to heat shifter rails and similar workpieces on a mass production basis by the use of high frequency induction, the machine having control mechanism which permits selected areas of each of the workpieces to be hardened as they pass through the machine, thereby eliminating expensive masking procedures. More specifically, we provide an induction heating machine for successively case hardening a plurality of shifter rails, with the hardness pattern of each shifter rail confined to specific areas thereon at the grooves thereof, and in particular to shoulders at such grooves.

A further object of our invention is to provide a machine which can be quickly adjusted and set up to change from a production run for one sort of shifter rail or other workpiece to a production run for another sort of shifter rail or other workpiece.

A further object of our invention is to provide an induction heating machine adapted to be differently set up to heat-treat different sorts of workpieces, but in such a manner that for each particular setup it will receive only a single sort of workpieces.

An important object of our invention is to provide a machine of the type described which requires no attention on the part of an operator other than to keep the machine supplied with workpieces to be heat-treated.

Still another object of our invention is to provide an induction heating machine having an induction heating coil energized by high frequency energy, but provided with protective and control means, preferably electrical, which will prevent application of the high frequency energy to the induction heating coil should the machine lack pieces of work or otherwise tend to operate improperly.

Still another object of our invention is to provide an induction heating machine of a type described in which dummy pieces or substitute work is supplied to the machine after all of the production workpieces to be heat-treated have been processed so that it is impossible to get a partially processed workpiece in the batch. In this connection the dummy pieces are preferably of a highly conducting metal such as copper or brass, which is easily distinguishable from the production workpieces which generally are ferrous in character. The dummy pieces can be used over and over again for the purpose of setting up the machine, and at the completion of production runs. An ancillary object of our invention is to provide an induction heating machine of the foregoing type having automatic means which automatically feeds dummy pieces to the machine right after all production workpieces have been fed thereto, the number of dummy pieces of work being enough to assure that all production pieces have been processed and discharged from the machine.

A further object of our invention is to provide an induction heating machine of a type described in which pieces of work are fed end to end in a train through an induction heating coil of the machine, each piece being rotated as it passes through the induction heating coil, the machine being provided with means operated by the presence of pieces in such train for maintaining it in operation and by the absence of such pieces for cutting off energization of the induction heating coil.

Another object of our invention is to provide an induction heating machine of a type described in which energization of the induction heating coil thereof is cut off whenever the train of work ceases to move through the machine.

Another object of our invention is to provide an induction heating machine of a type described for case hardening selected areas of each production workpiece of a train of workpieces constantly moving through the machine. In the preferred form of our invention, this is accomplished by keying the energy supplied to the induction heating coil of the machine through which the workpieces pass. In accordance with our invention, each workpiece of the train controls the keying of the energy to the induction heating coil, the keying being done in accordance with the hardness pattern desired for axially, or linearly, spaced areas on the workpiece. Specifically, our invention provides a timer means which is initiated for operation and after such initiation is operable through a cycle in which heating energy is temporarily supplied to a workpiece for obtaining the hardness pattern desired therefor. Preferably the operation of the timer is initiated by a moving workpiece through an initiating switch operated in accordance with the position of a workpiece in the machine. In a form of our invention, the switch is located along the horizontal travel path for the train of workpieces, and its operation is synchronized with the movement of a workpiece entering the induction heating coil, although its operation is initiated by another workpiece of the train. In accordance with our invention, the induction heating machine is provided with a plurality of timers corresponding to the different sorts of workpieces to be heat-treated thereby.

Still another object of our invention is to provide an induction heating machine of the type described having a loader portion or means through which a plurality of workpieces are kept aligned side by side and intermittently fed to a moving-means that moves the workpieces end to end continuously through an induction heating and quenching heat-treater unit of the machine. The heat-treater unit comprises an induction heating coil and a quench portion immediately following the induction heating coil in the line of travel of the workpieces. In accordance with an aspect of our invention, the energy to the induction heating coil is keyed, but the quenching water is supplied and flows from the quenching portion constantly. In this way the induction heating coil is effectively kept cool; and the heat treater unit of which it forms a part can be made small and compact. A utilizable heat-treater unit is described and claimed in the concurrently-filed application of W. L. Corteggiano and J. M. Edwards, Serial No. 104,943, now abandoned to which reference may be had for further details thereof.

An important feature of our invention is the provision of a special loader for use with machines of a type described. This loader feeds elongated workpieces to a conveyor moving in a direction corresponding to the length of the workpieces fed thereto. The loader has means for keeping the workpieces aligned side by side and has electrically actuated means for dropping the workpieces one at a time to the conveyor. The machine has parts which receive the workpieces from the conveyor and push them, as a train, in a substantially straight horizontal line therethrough.

A further object of our invention is to provide a machine of a type described having a detachable work loading magazine. In accordance with our invention, a plurality of such magazines are provided, each being interchangeably attachable for another in the machine; but each being so designed that it will receive only one particular sort of workpieces. The magazines are quickly changed so that the machine is easily changed from a setup for heat-treating a batch of one sort of workpieces to a setup for heat-treating a batch of another sort of workpieces.

An ancillary object of our invention is to provide each magazine with its own special plug which selects the particular timer which has been or can be adjusted for proper energization of the induction heating coil of the machine in accordance with a particular sort of workpiece which the magazine handles, whereby all guesswork on the part of an operator is eliminated.

Many objects, purposes, features, innovations, methods, combinations, subcombinations, and elements of our invention, in addition to the foregoing, will be discernible from the following description of a preferred form thereof, to which we are not limited. The description is to be taken in conjunction with the accompanying drawings in some figures of which details have been omitted in the interests of clarity and brevity.

In the drawings, which are on different scales.

Referring more particularly to Figs. 1 through 4, an induction heating machine in accordance with our invention comprises a loader portion indicated in its entirety by the reference numeral 1. The loader comprises a conveyor 2 on which it periodically places a workpiece W. The conveyor 2 moves the workpieces thereon axially, or in the direction of their lengths, to a work-carrying means which guides and moves the workpieces end to end past an induction heating and quenching heat-treater means. The latter are part of a horizontal scanner machine which forms the subject matter of the concurrently-filed application of W. L. Corteggiano and T. P. Kinn, Serial No. 104,942, to which reference may be had for additional details.

The horizontal scanner machine is indicated in its entirety by the reference numeral 3 and is supplied with high-frequency energy by a high-frequency generator 4 that has energizing conductors passing through a protective casing 5 to a current transformer 6. The current transformer 6 has a secondary provided with low inductance output conductors 7.

The scanner machine 3 comprises an understructure table 14 that may carry the current transformer 6, a bedplate 20 firmly horizontally secured to the top of the table 14 and carried on the bedplate 20 successively in the path of travel of the workpieces; a feeder 22, a headstock 24, an induction heating and quenching heat-treater unit 26, and a tailstock 28.

The feeder 22 comprises pressure-exerting and work-pushing means 30 and 32 spaced along said travel path. The feed-out end of the headstock 24 comprises a set 34 of work-supporting and work-rotating triangularly arranged rollers. The heat-treater means 26 comprises a head 35 having an induction heating coil portion 36 and a quench portion 38. The feed-in end of the tailstock 28 comprises a set 40 of rollers similar to those of the headstock.

A feed-in work-supporting guide 42 receives the workpieces from the conveyor 2 of the loader 1, the work-pushing force of the conveyor being small but sufficient to slide workpieces entering the feed-in guide 42 to the pusher means 30 of the feeder unit 22. The guide 42 comprises an elongated bar having a cross-section like the bar 44 shown in Fig. 3. The bar 44 has a work-contacting V-trough 46 in its upper face in which the workpieces move. Portions of the bar 44 can be provided with removable covers 47. The pusher means 30 and 32 comprise power-driven rollers 48 and 50 which slide the train of workpieces along the guide 42 and force them at a set speed through the rest of their horizontal travel path. The guide 42 terminates near the roller set 34 which imparts rotation to a workpiece thereat so that the workpiece rotates as it passes first through the induction heating coil 36 and then through the quench portion 38 of the heat-treater 26. The quench portion 38 is supplied with quench liquid, water, through a hose 52, the quench liquid discharging onto the workpiece through internal holes in the quench portion in a manner known to the art. Preferably, this water is supplied constantly during operation of the machine.

The induction heating coil 36 of the induction heating and quenching unit heat-treater 26 is connected to the high-current energizing conductors 7 of the transformer 6 which is connected to the high-frequency 4. This generator is preferably a tube oscillator and its energization of the transformer 6 is controlled by keying its grid circuit. In other words, for selective hardening of portions of each workpiece, the generator power is periodically cut off and restored.

As a workpiece passes through the heat-treater unit 26, it is engaged by the roller set 40 of the tailstock 28 and then passes to a feed-out guide 54 which is similar in construction to the feed-in guide 42, and also comprises an elongated V-troughed bar 44. Near the end of the travel of the workpieces in the feed-out guide 54, they pass a wheel 56 which rests lightly on the moving train of workpieces and is rotated thereby so long as the train is moving, the wheel rotating at a speed proportional to the speed of linear progression of the train, and correspondingly operating an electrical element 57. As each workpiece leaves the feed-out guide 54, it operates an electrical device in the form of an initiating switch 58 having a pivoted operating arm 60 which is lightly engaged by the leaving workpiece of the train.

The scanner machine 3 further comprises a variable speed drive for driving the lower rollers of the work-rotating roller sets 34 and 40, this variable speed drive comprising a motor 62 and gearing 64. The scanner machine further comprises a variable speed drive for rotating pusher rollers 48 and 50 of the pusher means 30 and 32, respectively, of the feeder 22. The latter drive comprises a motor 66 and gearing 68. If desired, this gearing can also drive the conveyor 2 of the loader 1 through a variable drive connection 69.

The loader portion 1 is shown in greater detail in Figs. 5 through 17. The purpose of the loader portion is to arrange the workpieces so that they are properly supplied to the horizontal scanner machine 3 for heat-treatment. In accordance with our invention, this loader portion has the added duty of automatically substituting dummy pieces for passage through the scanner machine 3 when the loader runs out of production workpieces to be heat-treated, more specifically to be case hardened. Also, in accordance with our invention, the loader is designed with a detachable portion or magazine so that a plurality of interchangeable magazines can be used with the single loader, each magazine being designed to receive a single sort of workpieces which is different from that received by another magazine.

In accordance with the preferred form of our invention, the loader portion 1 comprises a supporting framework 70 which includes a pair of spaced upright posts 72 and 74, and a reinforcing cross bar 75 across their upper ends. The framework carries a chute member 76, a workpiece magazine 78 detachably secured to the chute member 76, the conveyor 2, an electrically operable work-releasing means comprising release rods 82 and 84 operated by release solenoids 86 and 88, respectively, and an automatically operable selector means indicated in its entirety by the reference numeral 90.

Figures 15, 16:
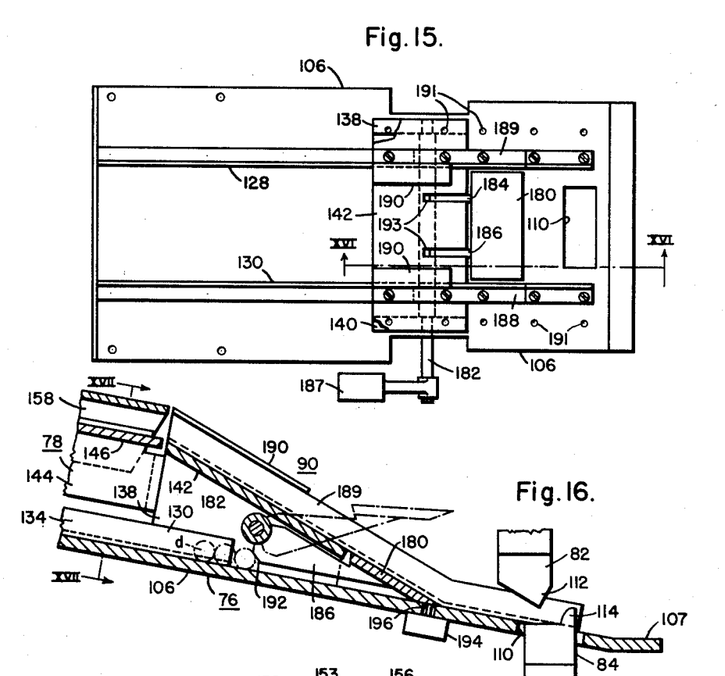
Fig. 15 is a plan view of a member of the loader of Fig. 5, that is adapted to detachably receive the magazine of Figs. 12—14, the magazine being omitted.
Fig. 16 is a sectional view substantially on the line XVI—XVI of Fig. 15 with the magazine added.
Figure 17:
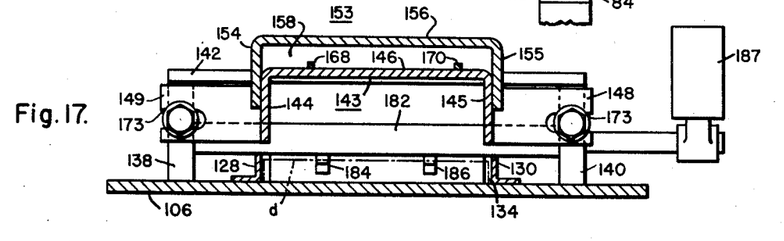
Fig. 17 is a sectional view substantially on the line XVII—XVII of Fig. 16.

The solenoids 86 and 88 are carried by the framework 70 and have armatures attached to the associated release rods 82 or 84 through spring biasing means 92 and 94 which tends to place each of the barrier rods 82 and 84 in the positions shown in Fig. 16 when the associated solenoid is deenergized. The release rods 82 and 84 control the release of work on the conveyor 2; and the selector means 90 allows only production workpieces in the magazine 78 to reach the rods 82 and 84 until the last such workpiece leaves the magazine. In such case the selector means 90 operates to allow dummy pieces to reach the rods 82 and 84.

Workpieces released by the release means comprising the bars 82 and 84 drop onto the conveyor 2 for conveyance to the feed-in guide 42. To this end the conveyor 2 comprises an endless belt, the upper run of which is preferably horizontal but can be slanted downwardly somewhat if desired. The conveyor belt is carried on supporting drums mounted on pillow blocks 95 carried by the framework 70. The conveyor belt moves in the direction of the arrows shown in Figs. 2, 4, 6, and 7, being constantly driven by the gearing 69 driven by the electric motor 66 of the scanner machine 3. Obviously, however, this belt can be separately driven if desired.

Immediately above the conveyor belt, the framework 70 of the loader 1 carries a pair of elongated guide bars 98 and 100 parallel to the conveyor belt. As shown more particularly in Figs. 5, 8 and 9, the guide bar 98 is partly an angular member having a vertically disposed leg 102 parallel to a vertically disposed leg 104 of the guide bar 100. The leg 102 of the guide bar 98 terminates just short of the delivery end of the selector means 90 from which the rod-like pieces of work roll one at a time onto the conveyor belt to the position shown by the lower dashed lines in Fig. 9. The upper part of bar 98 comprises a longitudinally extending portion 105; the space between this portion and the belt 2 providing a gateway through which a workpiece passes. A released workpiece rolls through the gateway and onto the conveyor belt 2, being stopped by the leg 104 of the guide bar 100. The conveyor 2 moves this workpiece between the guiding legs 102 and 104 of the guide bars 98 and 100, the entrance or feed-in end of the bar 98 being slightly bent out as indicated at 105' in Fig. 9 so as to avoid jamming. The conveyor carries the workpieces between these legs 102 and 104 and discharges them into the feed-in end of the feed-in guide 42, constantly pushing leading workpieces into the pusher means 42 and 44 of the feeder 22.

The pieces of work which are delivered to the conveyor 2 come from the chute member 76 of the magazine 78. Referring more particularly to Figs. 5 and 15–17, the chute member 76 has a bottom plate 106 that extends to the gateway provided by the guide rail 98. This plate 106 is inclined to the horizontal except for a short delivery end portion 107, as shown more particularly in Figs. 5 and 16. The release means comprising the release bars 82 and 84 is arranged and operated so that the pieces of work are fed to the conveyor 2 one at a time. To this end the delivery end portion 107 of the plate 106 has a small rectangular hole 110. The upper release bar 82 is above the hole and has a dividing nose 112 slightly above the hole. The lower release bar 84 is below the hole except for a stop nose 114. With the solenoids 86 and 88 of the bars 82 and 84 deenergized, the noses 112 and 114 are in the path of movement of pieces of work from the plate 106 to the conveyor 2, the noses spanning a single piece of work. When the lower solenoid 88 is energized, it pulls its associated nose 114 of the release bar 84 below the end portion 107 of the plate 106, and allows the workpiece between the noses to roll onto the conveyor. If the solenoid 88 is then deenergized, the spring bias forces the nose 114 back into the travel path for the pieces of work. By subsequent momentary energization of the upper solenoid 86, the nose 112 is raised allowing a piece of work to roll against the nose 114. Upon deenergization of the upper solenoid 86, the nose 112 lowers and this piece is caught between the noses 112 and 114. Subsequent energization of the solenoid 88 releases this "ready" piece of work, but another cannot roll into its place because of the barrier interposed by the nose 112 of the release bar 82.

Either dummy pieces or workpieces are fed by the selector means 90 to the release means described. The dummy pieces are fed to the selector means through a structure which is shown more particularly in Figs. 16 and 17. The dummy pieces ride on the upper part of the plate 106 of the member 76. The plate 106 has a pair of parallel angles 128 and 130 welded or otherwise secured thereto and terminating at an intermediate portion of the plate 106 in the region of the selector means 90. These angles 128 and 130 provide a chute or way 134 for the dummy pieces d, each of which may simply be a smooth cylinder of brass that can roll down in the way 134 to the selector means 90 through the action of gravity.

The selector means 90 comprises a short bridge-like structure carried on the bottom plate 106. This structure comprises a pair of upright side walls 138 and 140 that have sloped top edges on which a top 142 for the structure rests. The top 142 slopes more than the plate 106. The sides 138 and 140 and the bottom plate 106 of the loader detachably receive a loader magazine 78 in a manner that will later become apparent.

Referring more particularly to Figs. 12 through 14 and 17, the magazine 78 comprises a lower inverted U-shaped member 143 having upstanding sides 144 and 145 and a top or crossbar 146. The lower end of the member 143 is provided with securing ears 148 and 149 extending outwardly from the ends of the sides 144 and 145. The upper portion of the member 143 is provided with additional securing ears or flanges 150 and 151 extending outwardly from bottom portions of the sides 144 and 145.

Figure 5:
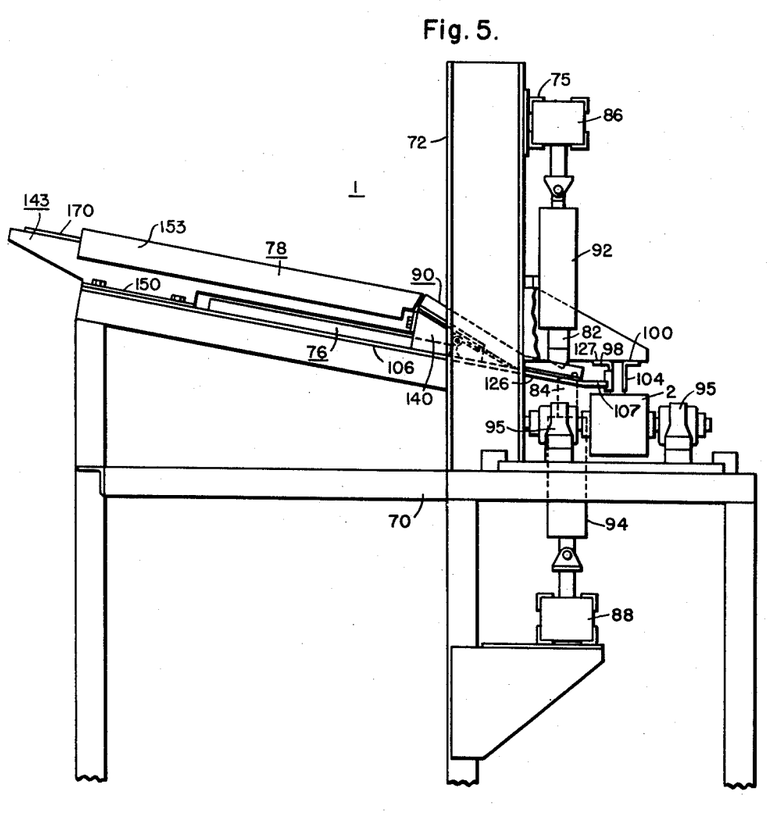
Fig. 5 is a side view of the loader portion of the machine of Fig. 1.
Figure 6:
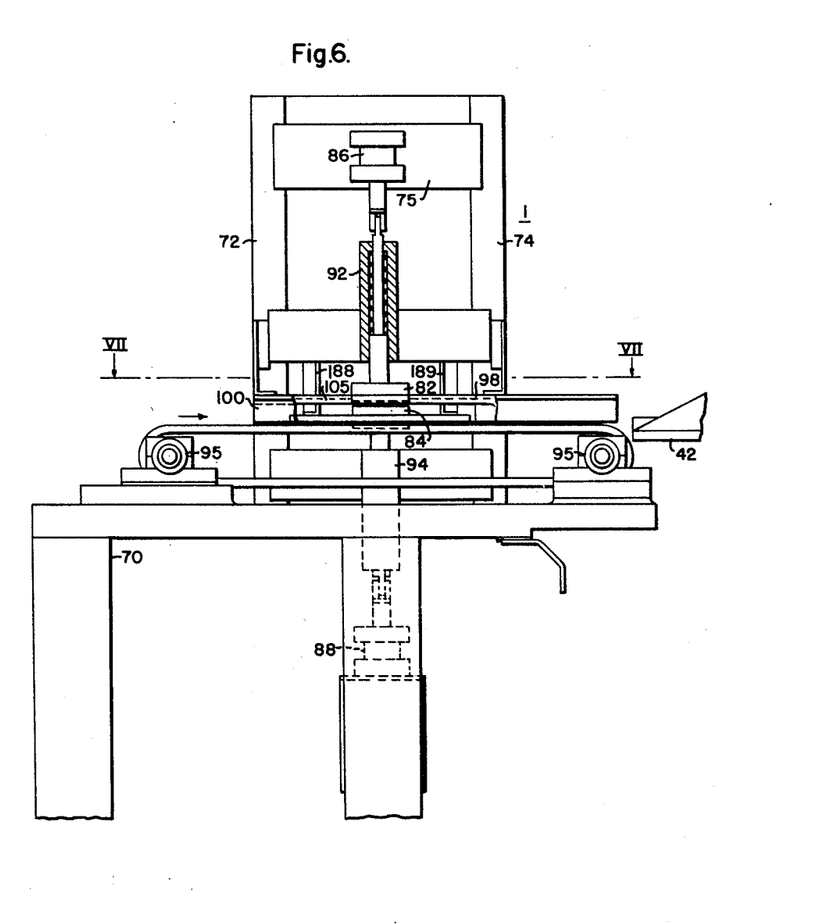
Fig. 6 is a front view of the loader portion of Fig. 5.
Figure 7:
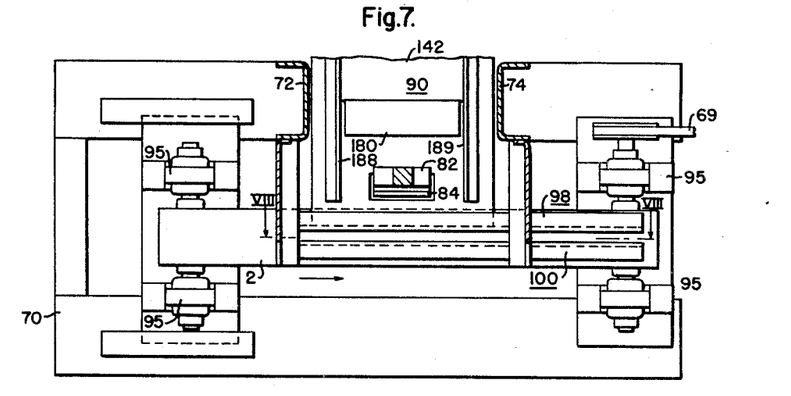
Fig. 7 is a sectional view substantially on the line VII—VII of Fig. 6.
Figure 8:
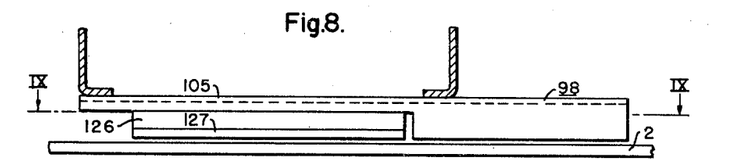
Figs. 8 and 9 are sectional views substantially on the lines VIII—VIII and IX—IX of Figs. 7 and 8, respectively.
Figure 9:
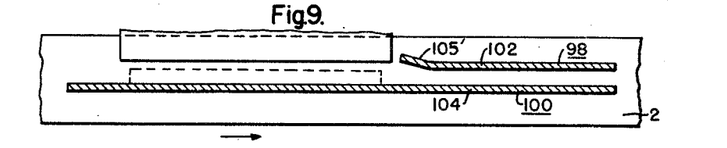
Figure 13:
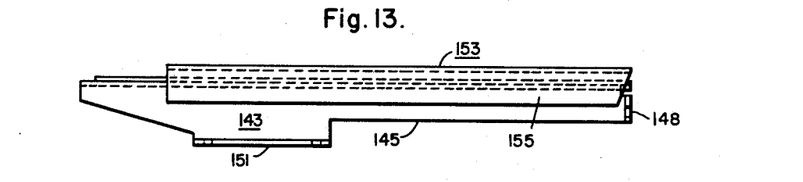
Figure 14:
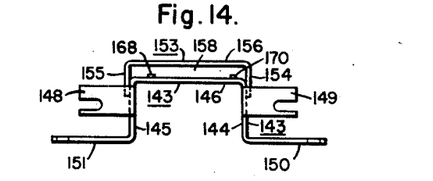
Fig. 14 is a front view of the magazine looking at the right-hand end of Fig. 13.

The magazine 78 further comprises an upper channel member 153 having downwardly extending legs 154 and 155 and a top crossbar 156. The legs 154 and 155 of the member 153 are secured to the outsides of the legs 144 and 145 of the member 143 with the crossbars 146 and 156 vertically spaced to provide a chute or way 158 for production workpieces to be heat-treated. As shown in Figs. 5 and 13, the member 153 is shorter than the member 143. Consequently the member 143 protrudes upwardly beyond the member 153 and provides a protruding upper platform on which an operator can place production workpieces that roll down the way 158. Each magazine 78 is designed so that the width of its way 158, that is, the distance between the sides 154 and 155, is only slightly greater than the length of the particular workpieces to be associated therewith.

Figure 10:
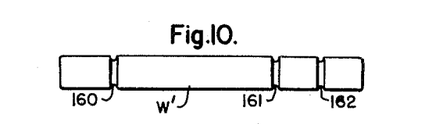
Figs. 10 and 11 are outside views of two different types of workpieces, in the form of shifter-rails, that can be heat-treated in the machine of Fig. 1.
Figure 11:
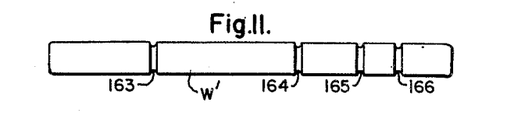
Figure 12:
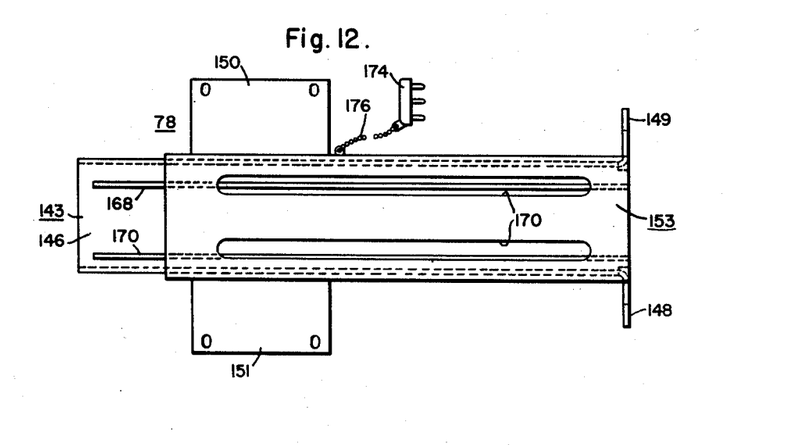
Figs. 12 and 13 are respectively a plan view and a side view of a magazine for the loader portion shown in Fig. 5.

Figs. 10 and 11 illustrate sorts of workpieces for which magazines 78 can be provided. In Fig. 10, the workpiece comprises a shifter rail W' having three circumferential or annular notches or grooves 160, 161 and 162, the groove 160 being at the left-hand end of the shifter rail and the grooves 161 and 162 at the right-hand end. The distance from the groove 160 to the left-hand end of the rail is different from the distance of either groove 161 and 162 to the right-hand end of the rail. Fig. 11 shows another form of shifter-rail W'' provided with non-symmetrically arranged circumferential or annular grooves 163, 164, 165 and 166, the distance from the groove 163 to the left-hand end of this rail being different from the distance from any of the other grooves to the right-hand end. It is to be noted that not only is the form or shape of the shifter rails of Figs. 10 and 11 different but that their lengths are also different, and our induction heating machine has adjustments which permit their diameters to be different also. Consequently, it should be understood that the shifter rails W' and W" are merely representative of workpieces treatable in our machine, so that the machine is not limited to the treatment of the exact workpieces shown.

The workpieces treated usually have grooves and, in accordance with our invention, advantage is taken of this fact to provide a magazine which will receive only the specially placed grooves of one particular sort of workpieces. To this end, the bottom floor of the way 158, which comprises the cross bar 146 of the member 143, has secured thereto a pair of positioning runner rails 168 and 170 which are parallel to the sides 154 and 155. The runners 168 and 170 are spaced to correspond to the spacing between grooves of a particular sort of workpieces. The distance between each positioning runner rail and the nearest side corresponds to the distance between a groove of a shifter-rail and the nearest end of the shifter-rail, the distances being so chosen that they are not duplicated by any other shifter-rail to be heat-treated in the machine. Preferably also, the height between the cross-bars 146 and 156 of the way 158 corresponds generally to the height of the workpieces riding on the positioning runner rails so as to further confine the workpieces; the distance between the top bar 156 and the bottom 146 being only enough to provide a space that will receive a workpiece whose grooves fit the runners 168 and 170. Consequently, a magazine 78 can be provided which will receive only shifter-rails for which it has been designed.

In accordance with our invention, a plurality of magazines 78 are provided each having a chute-way designed for the particular workpiece to be loaded through the particular magazine. All magazines, however, have securing ears or flanges provided with holes located in the same place for all magazines so that the magazines can be interchangeably detached to the lower chute member 76 and selector means 90 of the loader 1. To this end, as shown more particularly in Fig. 17, the upright lugs 148 and 149 of a magazine abut against the ends of sides 138 and 140, and have suitable slots 173 for receiving fastening bolts or other suitable quick-release detachable fasteners that fasten to the ends of the sides 138 and 140. In this position, the outwardly directed flanges 150 and 151 of a magazine rest on outwardly extended portions of the bottom plate 106 of the lower member 76, and these abutting portions are similarly provided with properly spaced holes for receiving quickly-releasable fastening means.

An outer side of each magazine 78 also has a circuit-selecting or -closing plug 174 attached thereto by means of an elongated cable 176, the plug for each magazine fitting a receptacle 177 (Figs. 1 and 4) carried by the framework 70 or table 14. The receptacle 177 is connected to a plurality of cycle timers carried by the machine, each timer having a plurality of time-controlled circuits that are adjusted in accordance with the sort of workpieces for the particular magazine 78 attached to the magazine. The plug 174 of this magazine has connections for selecting the proper cycle timer therefor. Two such timers 178a and 178b are shown and represent any desired number of them. Specific timers and plugs therefor are given the same reference numeral but different letters, so that generally descriptions of operations applying to a first of them can readily be understood as applicable in general to any other.

As is more apparent from Fig. 16, with a magazine attached, the loader portion 1 comprises two downwardly sloping parallel chute-ways 134 and 158, the way 158 being over the way 134. Both extend to the selector 90 which allows only workpieces in the upper way 158 to feed to the conveyor 2 until it is empty after which it automatically moves to allow dummy pieces d to feed from the lower way 134 to the conveyor.

Workpieces leaving the way 158 of the magazine 78 roll down on the inclined wall or floor 142 of the selector means 90. This incline has a lower tiltable barrier member 180. The barrier floor member 180 is secured to a shaft 182 through a pair of spaced support bars 184 and 186 that lie in the lower way 134 when the barrier floor member 180 is in the solid line position shown in Fig. 16. The shaft 182 is rotatably journalled in the side walls 138 and 140, and an end extends outwardly to receive a counterweight 187 arranged to provide a turning moment acting in a direction opposite to that of the tiltable floor member 180 and its associated bars 184 and 186.

The tiltable barrier floor member 180 is not as wide as the member 142 so that the selector can be provided with guide bars 188 and 189 outside of the edges of the tiltable member 180 which will not interfere with tilting of the member 180. The guide bars 188 and 189 keep workpieces rolling down on the inclined floor members 142 and 180 aligned side by side. If desired, the upper ends of the bars 188 and 189 can be provided with top members 190 to prevent a workpiece from riding on another. To accommodate different lengths of workpieces, the bars 188 and 189 are adjustably secured to the floor member 142 and bottom plate 106 of the chute member 76. Thus, several series of holes 191 are provided, in any of which the bars 188 and 189 can be removably secured.

The tiltable floor member 180 for the loader is provided so that dummy pieces of work will automatically be fed from the way 134 to the conveyor belt 2 whenever the last of the workpieces in the magazine 78 passes therefrom. To this end, the way 134 is provided with a predetermined number of dummy pieces d which have lengths that add up to at least the distance from the feed-in end of the induction heating coil 34 to the initiating switch 58. In normal operation, the first of these dummy pieces d bears against abutment edges 192 of the support bars 184 and 186 for the tiltable member 180, the bars being spaced less than the length of a dummy piece d. These edges 192 of the bars 184 and 186 are immediately under the shaft 182. There is some force exerted by the dummy workpieces d against the abutment edges 192 that tends to lift the tiltable floor member 180 between the bars 188 and 189, but the lifting force can be made very small, and the length and slope of the floor member 180 are adequate so that a single production workpiece on the top of the floor member 180 keeps it in the solid line position of Fig. 16 against all normal forces tending to turn it counterclockwise. Assuming that a last production workpiece leaves the top of the tiltable floor member 180, the action of the counterweight 187 is no longer opposed, and the shaft 182 will turn so as to raise the tiltable floor member 180, the bars 184 and 186 moving through slots 193 in the upper floor member 142. The floor member 180 moves to the broken line position shown in Fig. 16, allowing dummy pieces to roll down the bottom plate 126 so that they reach the release mechanism comprising release bars 82 and 84.

It is to be noted that a protective switch 194 has an upwardly biased operating bar 196 projecting upwardly through a small hole in the bottom plate 106. This hole is located so as to be covered by the end of the tiltable floor member 180 when the end rests on the plate 106. Normally, the floor member 180 depresses the operating bar 196 to keep the switch 194 operated. When the floor member 180 rises, the switch condition changes, but each dummy piece $d$ rolling or resting over the aforesaid hole also depresses the operating bar 196 so as to operate the switch 194.

*Brief operation of the scanner machine*

In the operation of the parts thus far described, a magazine 78 is attached to the chute member 76 and its plug 174 inserted in a suitable receptacle therefor. Assume that an operator keeps the magazine filled with the particular shifter-rails for which the magazine is designed. The shifter rails roll down the magazine, keeping the tiltable floor member 180 in depressed position and the switch 194 operated. The shifter rails are released to the conveyor belt 2 one at a time by sequentially spaced momentary energization of first the solenoid 88 and then the solenoid 86. The conveyor moves the released rail between the guides 98 and 100 and into the feed-in guide 42 of the scanner machine 3. The conveyor belt runs just a little faster than the train of rails in the scanner machine so that there is never any gap between rails of the train in the scanner machine 3.

As the entering shifter-rail moves along the feed-in guide 42, it passes between the rollers 48 and 50 of the pusher means 32 and 34 of the feeder 22 which pushes it through the scanner machine 3. After leaving the pusher rollers 48 and 50, each rail moves into the headstock 24, into the set 34 of work-rotating rollers of this headstock, and from there into the induction heating coil 36 of the head 25 of the induction heating and quenching unit 26. As each rail moves through this induction heating coil, the high-frequency generator 4 is keyed so as to apply high-frequency heating energy to the coil 36 for inductively heating the rail at certain portions only of its length, preferably those at the grooves of the rail. To this end, the rails must key the RF generator. In accordance with our invention, this keying is done by a timer mechanism to be later described which can operate through a cycle initiated by each rail passing a predetermined point in its line of travel. Preferably, the rail is that leaving the feed-out guide 54. Consequently, it is desirable to secure the initiating switch 58 on the bedplate 20 in a longitudinally adjustable manner, so that the time of its operation by a rail for initiating an operation cycle of the timer, is time-related to the position and speed of a rail entering the induction heating coil 36. The speed factor can be eliminated by having the train of rails pass through the scanner machine at a predetermined speed. Preferably also, the wheel 56 is adjustably placed along the feed-out guide 54 so that it prevents a rail from tipping from the guide before the end of the rail actuates the initiating switch 58. In other words, a leaving rail tilts off the end of the feed-out guide while the succeeding rail moves along the feed-out guide until it contacts and operates the initiating switch 58, after which it also tilts and falls from the feed-out guide.

Figure 1:
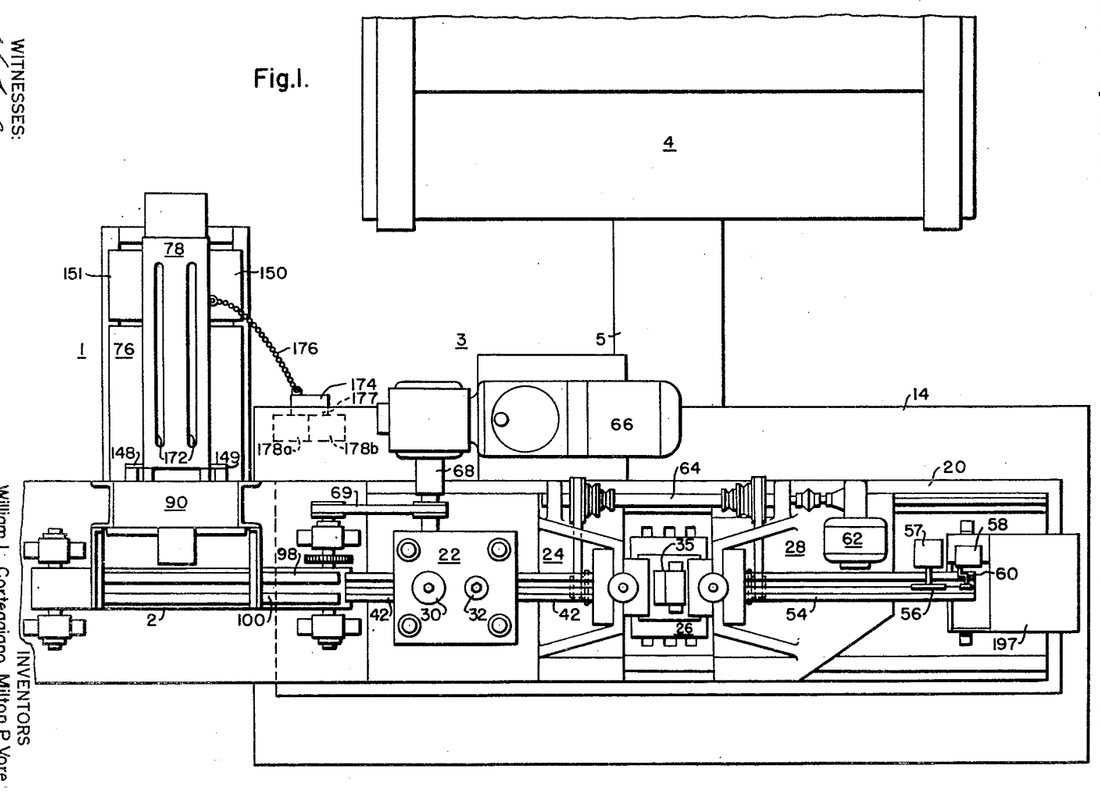
Figure 1 is a plan view of an induction heating machine embodying the principles of our invention.
Figures 2, 3:
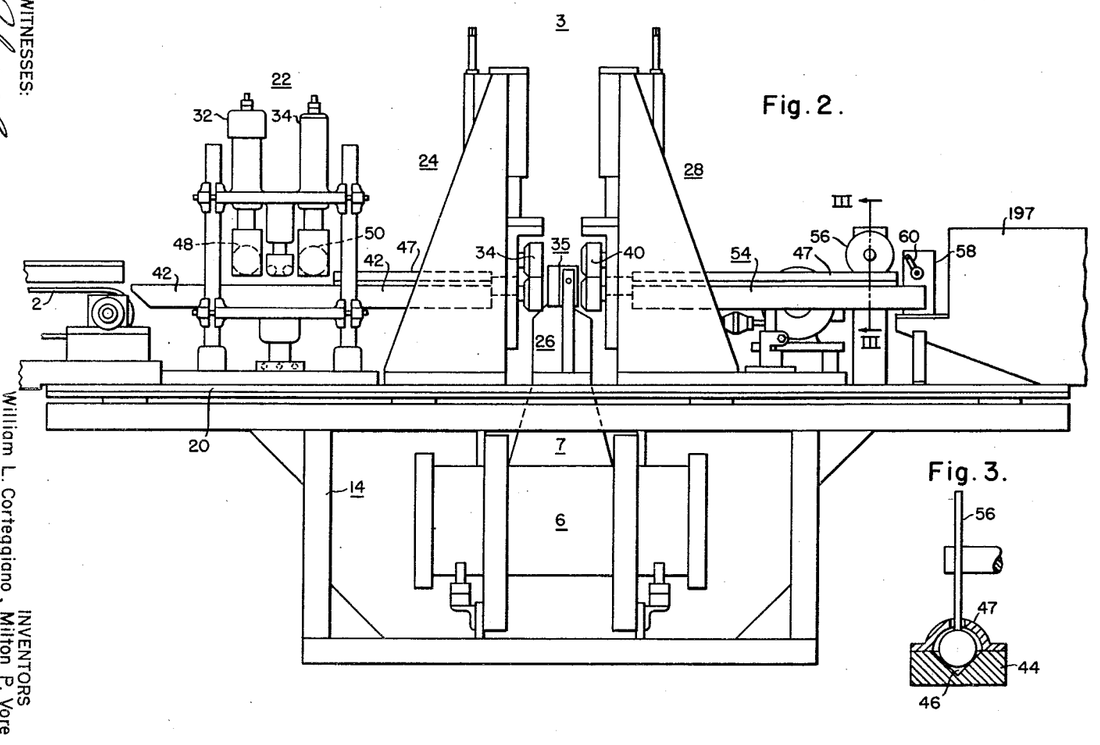
Fig. 2 is a front elevation view of a horizontal scanner machine portion of the induction heating machine of Fig. 1.
Fig. 3 is a vertical sectional view substantially on the line III—III of Fig. 2.
Figure 4:
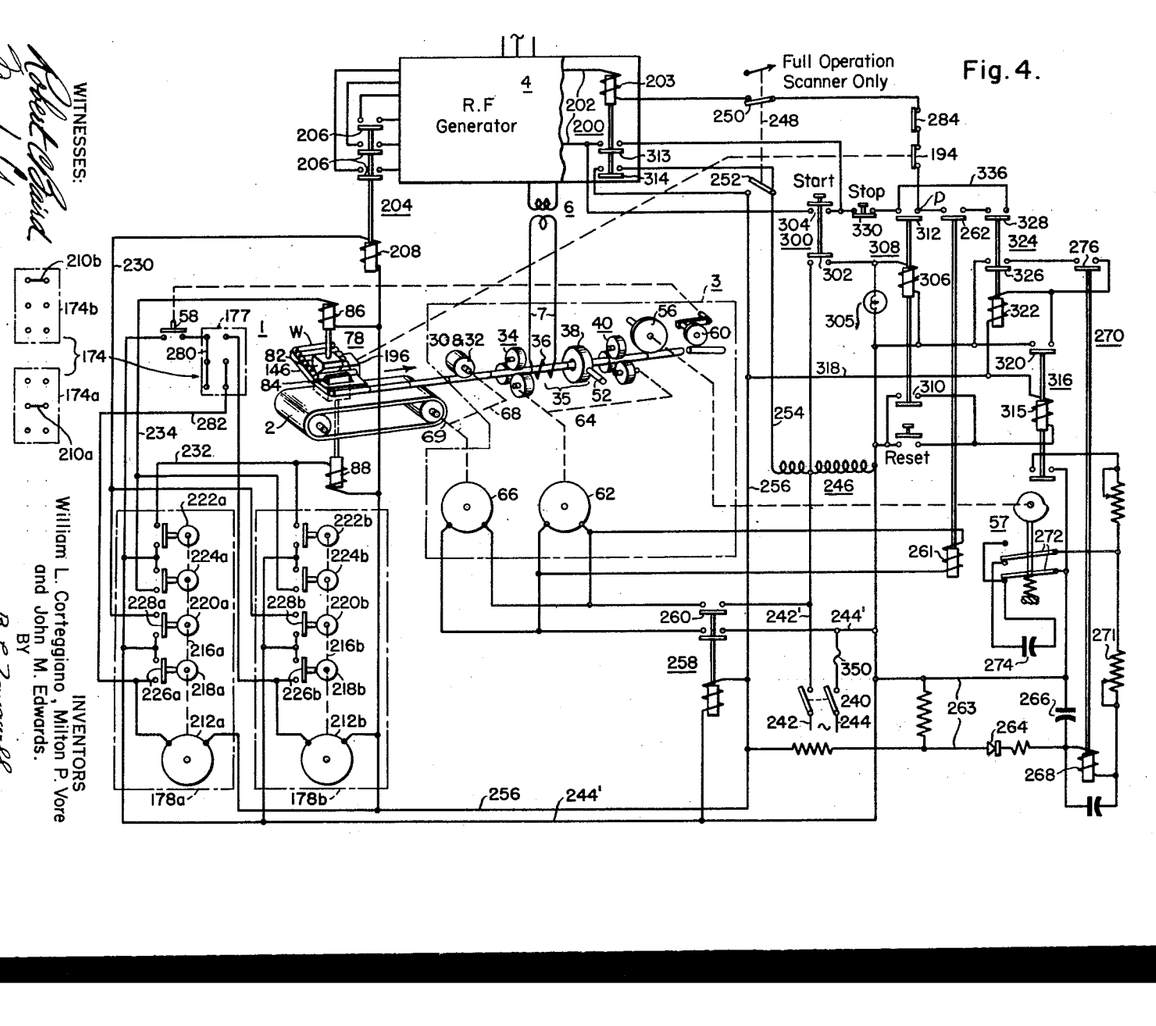
Fig. 4 is a schematic electrical diagram of the electrical arrangement and connections embodying principles of our invention suitable for the machine shown in Fig. 1, mechanical connections between parts being indicated by broken lines therebetween.

In Fig. 4, elements of the induction heating machine hereinbefore described are shown schematically, mechanical interconnections between elements being shown by broken dashed lines and some items being enclosed in broken dot-dash lines to identify them. Thus, the loader 1 has aligned side-by-side workpieces W on the inclined plate 146 of the magazine 78 and on the inclined floor member of the selector 90, including the floor member 180. So long as workpieces are on the delivery end of the inclined floor member 180, the operating member 196 of the switch 194 keeps the switch closed. When solenoids 86 and 88 are suitably operated, single workpieces are released by the release bars 82 and 84, and each workpiece rolls onto the conveyor 2. The conveyor 2 feeds the workpieces to the horizontal scanner machine 3 where they successively pass the work-pusher means 30 and 32 (driven by motor 66 through gearing 68), the work-rotating roller-set 34 of the headstock (driven by motor 62 through gearing 64), the induction head 35 (comprising the induction heating coil 36 connected by conductors 7 to the transformer 6, and the quench portion 38 fed by water through hose 52), and the work-rotating roller-set 40 of the headstock (driven by the motor 62 through gearing 64).

In moving through the machine, the train of workpieces rotates the wheel 56 at a speed proportional to that of the progression of the workpiece-train; the wheel 56 being mechanically interconnected to a double pole reversing switch 57 and operating it in timed sequence proportional to the rotation of the wheel 56.

As a workpiece moves it operates the switch-operating member 60 at a predetermined point in the line of travel of the workpiece; more specifically near the end of its travel, just before it falls from the machine. Such operation of the operating member 60 momentarily closes the switch 58 to which it is mechanically interconnected.

Unless suitable controls are provided for a machine of the type described, the energy supplied to the induction heating coil may be sufficient to melt a workpiece if the train of rails does not travel at or faster than the desired speed; and, consequently, considerable damage might be done to the machine. In accordance with our invention, we provide automatic means which not only keys the energy supplied to the induction heating coil in accordance with the areas of the surface of each workpiece desired to be case hardened but also prevents energy from being supplied to the generator should the train of rails move slower than the desired speed as it might do should the train jam. Controls are also provided to cut off energy to the induction heating coil after the last of the available production workpieces has left the machine so that no untreated production workpieces will fall into a batch of heat-treated workpieces in a container or bin 197. Furthermore, it is desirable not to apply energy to the induction heating coil until the machine is in proper operating condition as determined from dummy pieces of work moving through the machine at the proper rate. For accomplishing the foregoing and other objects, we provide the machine with a preferred electrical circuit control schematically indicated in Figure 4, this circuit being integrated with the various controlling switches and induction heating coil of the machine.

*High-frequency generator control relays*

The tube-oscillator 4 has three status-conditions: first an inoperative condition in which its parts are not, in general, energized; second, a stand-by condition in which its parts are, in general, partially energized but the generator is not delivering high frequency energy to the transformer 6, and third, a power-delivery condition in which the generator delivers high-frequency power to the transformer 6 and hence to the induction heating coil 36. The controls inside the generator for this purpose are not part of our invention and any conventional or suitable circuits can be provided therefor as is known to the art. In Fig. 4, a stand-by relay 200 is shown as inside the generator 4, and controls a branch-circuit 202 which, in turn, controls power-circuits to parts of the generator. The relay 200 has an operating coil 203 which is connected in series with controlling contacts and switches to be described, so that these contacts and switches control the energization and deenergization of the branch-circuit 202 for controlling the generator. For example, the branch-circuit 202 can control the application of the D. C. plate voltage. When the branch-circuit is deenergized, no plate voltage is applied to the tubes of the generator, and the generator is in its first condition. When the branch-circuit is energized, the plate power is applied and the generator is in its second, or stand-by, condition. For placing the generator in its third or power-delivery condition, a keying relay 204 is provided having normally-open contacts 206 and an operating coil 208. Whenever the coil 208 is energized, contacts 206 close and may complete grid circuits of the generator.

*Cycle-timer selection*

The keying of the relay 204 is done by the particular cycle-timers, for example, 178a or 178b which are selected by the particular magazine 78 used with the loader 1 of the machine. The magazine 78, through its plug 174, determines which timer will be operative. As illustrated at the left of Fig. 4, two plugs 174a and 174b represent the plugs of two different workloader magazines 78. Each plug can be individually fitted to the receptacle 177, but each plug has a different connection 210a and 210b, respectively, for differently connecting the conductors leading to the receptacle so as to select its proper cycle-timer for the particular sort of workpiece in the magazine to which the plug is attached by the chain 176. In operation, a cycle-timer also operates the release solenoids 86 and 88 for the loader.

*Cycle-timers*

Each cycle-timer is of a conventional type which, upon receiving a starting impulse, operates through a single predetermined timed cycle and then stops until it receives another starting impulse. During its cycle the timer sequentially closes a plurality of circuits for predetermined adjustable periods. To this end, each of the timers 178a and 178b comprises, respectively, a constant speed motor 212a and 212b, the speed at which it runs being adjusted in any suitable manner. Each of the motors 212a and 212b drives, respectively, cam-shafts 216a and 216b having a plurality of switch operating cams 218a, 220a, 222a, 224a, and 218b, 220b, 222b, 224b, respectively.

The cams 218a and 218b can operate switches which provide holding circuits 226a and 226b, respectively, for maintaining the associated motor energized for its time-cycle.

The cams 220a and 220b can operate switches 228a and 228b, respectively. Each cam can be adjusted for closing its switch once or a plurality of times within the cycle of operation of the associated timer. The switches 228a and 228b independently control a circuit 230 to the operating coil 208 of the keying relay 204.

Each of the cams 222a and 222b can operate its associated switch briefly once during the timer-cycle, the switch controlling a circuit 232 to release solenoid 88. Each of the cams 224a and 224b can operate its associated switch briefly once during its timer-cycle, the switch controlling a circuit 234 to the release solenoid 86. The cam-adjustments of a timer are such that the solenoid 88 is operated and released before the solenoid 86 is operated. The time required for each timer to complete a cycle is just less than the time required for a shifter rail to pass a fixed point in its travel path in the scanner machine.

*Major preparations for operation (electrical)*

Assume that the equipment is shut down and that it is desired to case harden a plurality of selected areas only on a shifter rail such as shown in Figs. 10 or 11, the areas being the grooved portions of the shifter rails. First the proper magazine 78 is attached in the loader portion, and its plug, assumed to be plug 174a, is fitted in the receptacle 177. The cams of the timer 178a are suitably adjusted in accordance with the distance of the operating member 60 of the initiating switch 58 from the heat-treater head 35, the desired speed of travel of the train of shifter rails, and the spacing of the grooves on a shifter rail. Incidentally, the case depth imparted to a shifter rail depends on the speed of the train, other things being equal.

Dummy pieces of brass or similar metal and of a length equal to the shifter rails are first placed in the loader; and the main power supply switch 240 at the lower right center of Fig. 4 is closed. Power from mains 242 and 244 is applied to an auto-transformer 246 through auxiliary power mains 242' and 244', but nothing else happens with the electrical parts in the positions shown in Fig. 4. A hand operated operation switch 248 is then moved to its Scanner Only position so that its upper contact 250 is opened and prevents energization of the generator stand-by relay 200, and its lower contact 252 is closed and completes a power supply from the end 254 of the auto-transformer 246 to auxiliary power supply conductor 256. Consequently power is now available across power conductors 244' and 256.

With power on conductors 244' and 256, the motor-start relay 258 is energized. The relay 258 closes its contacts 260, connecting power from mains 242' and 244' to the motors 62 and 66 and to a protective relay 261. As a result conveyor 2 and the rollers of pusher means 30 and 32 operate to push work through the machine and the roller sets 34 and 40 operate to rotate each piece of work passing through the heat-treater head 35. At this stage of the starting operations, the pieces of work are dummies and are fed by hand to the conveyor 2. Operation of protective relay 261 causes it to close its contacts 262 but no circuit is thereby completed at this point.

With power on conductors 244' and 256 a charging circuit 263, shown in the lower right-hand corner of Figure 4, is completed, this circuit 263 comprising a half-wave rectifier 264 and a large capacitor 266. Connected across the capacitor 266 is a circuit comprising the operating coil 268 of a sensitive relay 270 and an adjustable resistor 271 connected to the blades 272 of the double pole reversing switch 57. The train of dummies moving through the machine rotates the speed-responsive wheel 56 which in turn operates the reversing switch 57. Operation of the blades 272 of the switch alternately reverses the polarity of capacitor 274 which is much smaller than the capacitor 266. When the wheel 56 comes up to speed, the sensitive relay 270 receives a series of direct current pulses the average of which is adequate to operate the sensitive relay 270 and it closes its contacts 276 but nothing happens pending subsequent operation of additional contacts.

As the train of dummies passes through the machine, each leading piece operates the operating member 60 for the initiating switch 58. With the plug 174a in the receptacle 177 and with power across auxiliary mains 244' and 256, a momentary closure of the switch 58 closes a circuit that traces as follows: the main 244', the switch 58, the conductor 280 of the receptacle 177, the cross conductor 210a of the plug 174a, the conductor 282 of the receptacle 177, the motor 212a of the timer 178a, to the main 256. The motor 212a starts to rotate and its cam 218a closes the associated switch to close the holding circuit 226a for the motor, this circuit remaining closed until the timer-cycle is completed so that subsequent opening of the initiating switch 58 when the aforesaid leading piece of work falls from the machine will not stop the timer 178a. As the timer goes through its cycle its cams 222a and 224a sequentially connect circuits 232 and 234 across the mains 244' and 256 so as to sequentially operate the release solenoids 88 and 86 to release a piece of work to the conveyor 2 to replace the piece leaving the train at the other end of the train. Also the cam 220a keys the keying relay 204, but this has no effect on the generator 4 at this time.

The preparatory set-up includes a water supply that feeds cooling water to the generator 4 and the induction heating coil 36 and feeds quench water to the quench portion 38. This water supply may contain a pressure responsive protective switch-contact 284 in a circuit to the operating coil 203 of the stand-by relay 200, the contacts 284 remaining closed only so long as the water supply is proper.

Heat-treating operations

Assuming that the preparatory adjustments and operation are all satisfactory, the apparatus is now ready to heat-treat production workpieces. The operation control switch 248 is moved from Scanner Only position to full operation position. The contacts 252 are opened, momentarily stopping all moving parts by temporarily deenergizing the main 256. The contacts 250 of the switch 248 are closed so as to prepare the circuit 202 through the operating coil 203 of the stand-by relay 200; this circuit leading through the coil 203, the contacts 250, the water-protection contacts 284, the contacts 194 closed by the presence of work on the inclined plate 106 of the loader 1, to a point P.

The start button 300 is now closed, closing its contacts 302 and 304. Closure of contacts 302 completes a circuit to a signal light 305 and to the operating coil 306 of a relay 308; the circuit passing from main 242', through contacts 302, and the coil 306, to the main 244'. The relay 308, now energized, closes its contacts 310 and 312.

Closure of contacts 312 of the relay 308 completes the rest of aforesaid circuit for coil 203 of relay 200, from the point P, through the contacts 312, the normally-closed contacts 330 of the stop button, the held-closed contacts 304 of the start button, to the other side of the branch-circuit 202. As a result, the relay 203 energizes, closing its contacts 313 and 314. The closed contacts 314 are connected in parallel across the now open contacts 252, so that closure of the contacts 314 reconnects the supply main 256 to the end 254 of the autotransformer 246.

Closure of contacts 310 of relay 308 completes a circuit from main 244', the contacts 310, the operating coil 315 of a relay 316, and a conductor 318 connected to the main 256. Operation of relay 316 closes its contacts 320. Closed contacts 320 complete a circuit from main 244', the closed contacts 320, the operating coil 322 of a control relay 324 to the conductor 318 connected to the main 256. The operated relay 324 closes its contacts 326 and 328 which prepare circuits later described.

At its contacts 313, the relay 200 closes a holding circuit around the start contacts 304, so that the relay remains energized when the start button is subsequently released, the holding circuit including the contacts 330 of the stop button.

When main conductor 256 is reenergized by closure of contacts 314 of relay 200, the relay 258 is reenergized whereupon the motors 62 and 66 are restarted and the relay 261 is re-energized closing its contacts 262.

Inasmuch as contacts 328 of relay 324 are closed as before described, closure of contacts 262 completes a second branch 336 from the point P. This branch contains the contacts 262 and 328 in series, and is in parallel with the contacts 312 of the relay 308 energized by depression of the start button. Consequently, the circuit for the relay 200 has an alternative path through branch 336, the stop button 330 and contacts 313, should the start button be released and deenergize the operating coil 306 of the relay 308. However, the start button should be held closed for a while to insure the re-starting of the motors 62 and 66 starts the train of work and brings it up to speed for operating the wheel 56 until the sensitive relay 270 operates. This relay closes its contacts 276, completing a holding circuit for the operating coil 322 of the control relay 324, this holding circuit being traced as follows: main 244', contacts 326 and 276, coil 322, conductor 318 and main 256. Consequently, the branch 336 will remain closed so long as power is available at the motors 62 and 64 for keeping relay 261 energized to maintain its contacts 262 closed. As a result the stand-by relay 200 remains energized.

With the relay 200 energized, the generator 4 is in stand-by condition to supply high frequency power to the transformer 6 and such power can be transferred to the induction heating coil 36. Production workpieces can now be supplied to the magazine 78. As each piece of work leaves the train, it actuates the switch 58 that starts the proper timer 178 through its cycle. The timer keys the relay 204 to cause high frequency power to be supplied to the heating coil 36 for short periods whenever a section of a workpiece which is to be hardened is passing through the induction heating coil. The timer also releases another workpiece onto the conveyor 2, through operation of release solenoids 88 and 86.

An example of workpieces heated in our machine comprises shifter rails of a type shown in Figs. 10 and 11. Shifter rails ½ inch in diameter were case hardened at selected areas only. Batches comprised rails having a length of $4\frac{7}{16}$ inches, $6\frac{13}{32}$ inches, and $6\frac{13}{32}$ inches. The rails of a batch were S. A. E. 1046 steel and were moved through the machine at a speed .7 inch per second or at .76 inch per second. For a speed of .7 inch per second and rails $4\frac{7}{16}$ inches in length, having three closely spaced grooves, the timer was keyed one time by the keying relay 204 for a keying period lasting 1.05 seconds. The generator supplied high frequency energy at a frequency of 450,000 cycles per second.

Some protective features

Should either motor 62 or 64 draw excess current, a thermal element 350 at the main switch 240 operates to deenergize the main 244'. The control relay 322 is deenergized, opening its contacts 328 in the branch circuit 336 for the standby relay 200. The stand-by relay 200 opens its contacts 332 and 334, and the generator is placed in its initial inoperative condition.

Should a rail jam in the machine, the wheel 56 will not rotate at the required speed, and as a result the sensitive relay 270 becomes deenergized and opens its contacts 276. The control relay 322 is deenergized this time through opening of the contacts 276 in its holding circuit. The generator 4 will not be operative to deliver power to the stalled train of workpieces.

If production workpieces cease being supplied to a magazine 78 of the loader, the dummy pieces are fed to the conveyor 2 until all production workpieces have been heat-treated. When the last of the dummies leaves the loader 1, the protective switch 194 stays open, deenergizing the stand-by relay 200 before the last of the dummies has passed through the induction heating coil.

It is to be noted that whenever the stand-by relay 200 becomes deenergized, the main 256 is disconnected from the end 254 of the autotransformer 246, by opening of contacts 314. As a result the machine shuts down.

The machine can be normally shut down by depressing the stop button and opening its contacts 330 which are in the circuit for the stand-by relay 200.

While we have described our invention in a preferred embodiment, it is obvious that its principles and teachings are of general application and can be embodied in other embodiments.

We claim as our invention:

1. An induction heating machine of a type described for heat-treating rod-like workpieces comprising in combination, an induction heat-treater means having a central work-receiving opening, a loader having a work-container magazine and a dummy-containing portion, work-carrying means for guiding and moving workpieces end to end through said heat-treater means for heat-treatment, means for releasing workpieces one at a time from said magazine to work-carrying means, and automatic selector means operable to supply dummies from said dummy-containing portion to be released to said work-carrying means when said magazine becomes empty with energizing means for said heat-treater means, and a control for said energizing means in response to the position of said automatic selector means.

2. An induction heating machine of a type described for heat-treating rod-like workpieces comprising in combination, an induction heat-treater means having a central work-receiving opening, a loader having a work-container magazine and a dummy-containing portion, work-carrying means for guiding and moving workpieces end to end through said heat-treater means for heat-treatment, means for releasing workpieces one at a time from said magazine to said work-carrying means, and automatic selector means operable to supply dummies from said dummy-containing portion to be released to said work-carrying means when said magazine becomes empty, said loader comprising a wall between said magazine and said dummy-containing portion, said wall comprising a biased portion biased towards a first position to permit dummies to be released, said biased portion being held in a second position by workpieces in said magazine to prevent release of dummies, with energizing means for said heat-treater means, and a control for said energizing means, comprising a switch operable in response to the position of said biased wall-portion relative to the position of said switch.

3. An induction heating machine of a type described for heat-treating rod-like workpieces comprising in combination, path-providing means for successively moving workpieces along a path with the workpieces moving linearly in the direction of their lengths; loader means through which workpieces are fed to said path-providing means; said path-providing means comprising successively in the direction of movement of workpieces: a first work-supporting and rotating means, a heat-treater means comprising an induction heating coil, and a second work-supporting means; high-frequency generator means having connections for energizing said induction heating coil; said loader means having a switch means associated therewith, said switch means being arranged to be operable in accordance with the workpiece load in said loader means, and correspondingly controlling the application of energy from said generator means to said induction heating coil; and switching means operable by movement of workpieces along said path for also controlling the application of energy from said generator to said induction heating coil so the amount of energy applied to each portion of each of the workpieces may be thereby controlled.

4. An invention in accordance with claim 3 but further characterized by the last said switching means comprising a wheel arranged to rotatably engage workpieces moving along said path.

5. An induction heating machine of a type described for heat-treating rod-like workpieces comprising in combination, an induction heat-treater means comprising an induction heating coil and quench ring having a central work-receiving opening, a loader having a work-container magazine, work-release means comprising a pair of spaced stops in the path of workpieces in said loader, electrical means including stop-moving devices for moving said stops out of said path to release a single workpiece, means for receiving released workpieces and pushing a train of workpieces end to end through a path including said opening, high-frequency energizing means adapted to energize said induction heating coil, and electrical means comprising a timer means initiatable to operate through a cycle for causing said energizing means to energize said induction heating coil periodically during said cycle, and for selectively operating said stop-moving devices, and a switch means, a weight operated member in said loader, said member being weighted by workpieces in said loader, said switch means being operated by said member for controlling the energization of said induction heating coil by said energizing means.

6. Apparatus of a type described comprising in combination, a machine for heat-treating batches of shifter rails, the rails of a batch being substantially the same size and shape but different from those of a different batch, each rail having a plurality of axially spaced grooves to be hardened inductively, an induction heating coil, a plurality of timer means each for controlling the periods of energization of said induction heating coil for selective heating of each rail, means comprising a detachable magazine for feeding rails end toward end through said induction coil, said magazine comprising means arranged thereon so as to receive only one sort of rails, and control means associated with said magazine cooperating only with the timer adapted to cause energization of said induction heating coil in accordance with the sort of rail in said magazine.

7. In combination, heat-treating apparatus for treating a plurality of different types of workpieces comprising a detachable magazine which is adapted to receive only one type of workpiece to be heat treated and control means attached to said heat-treating apparatus for controlling the operation thereof for heat treating the workpieces in accordance with the type of workpieces in the magazine, said magazine being adapted to feed said workpieces to be treated into said heat-treating apparatus.

8. A magazine for containing workpieces to be fed into a heat-treatment apparatus for treating said workpieces, said heat-treatment apparatus including control means for controlling the operation of said heat-treatment apparatus, said magazine being adapted to receive only one type of workpiece to be treated, with said magazine comprising contact means adapted to contact said control means so as to cause said control means to operate in a predetermined manner dependent upon the type of workpieces in the magazine.

WILLIAM L. CORTEGGIANO.
MILTON P. VORE.
JOHN M. EDWARDS.

References Cited in the file of this patent

UNITED STATES PATENTS

| Number | Name | Date |
|---|---|---|
| 1,615,220 | Gaine | Jan. 25, 1927 |
| 1,682,999 | Tenney | Sept. 4, 1928 |
| 1,697,811 | Dailey | Jan. 1, 1929 |
| 1,705,082 | Brigham | Mar. 12, 1929 |
| 1,749,262 | Roark | Mar. 4, 1930 |
| 1,806,879 | Lindgren | May 26, 1931 |
| 1,849,238 | Lindgren | Mar. 15, 1932 |
| 2,037,931 | Schmidt | Apr. 21, 1936 |
| 2,202,759 | Denneen et al. | May 28, 1940 |
| 2,218,444 | Vineyard | Oct. 15, 1940 |
| 2,237,659 | Edwards | Apr. 8, 1941 |
| 2,249,529 | Knights | July 15, 1941 |
| 2,325,638 | Strickland | Aug. 3, 1943 |
| 2,357,888 | Gookin | Sept. 12, 1944 |
| 2,363,724 | Ford | Nov. 28, 1944 |
| 2,393,363 | Gold et al. | Jan. 22, 1946 |
| 2,400,472 | Strickland | May 14, 1946 |
| 2,410,492 | Garrow | Nov. 5, 1946 |
| 2,417,678 | Cox | Mar. 18, 1947 |
| 2,430,005 | Denneen et al. | Nov. 4, 1947 |
| 2,465,306 | Durand | Mar. 22, 1949 |
| 2,470,707 | Leston et al. | May 17, 1949 |
| 2,572,073 | Strickland et al. | Oct. 23, 1951 |
| 2,578,760 | Strickland | Dec. 18, 1951 |